US005790638A

United States Patent [19]
Bertacchi

[11] Patent Number: 5,790,638
[45] Date of Patent: Aug. 4, 1998

[54] SIGNALING IN CALL TRANSFER CALLING OPERATIONS TO CONTROL THE INITIATION OF SECONDARY NUMBER TELEPHONE SERVICE FEATURES

[75] Inventor: Luciano Bertacchi, Pierrefonds, Canada

[73] Assignee: Telefonaktiebolaget L M Ericsson (publ), Stockholm, Sweden

[21] Appl. No.: 659,876

[22] Filed: Jun. 7, 1996

[51] Int. Cl.$^6$ .................................................. H04M 1/64
[52] U.S. Cl. .................. 379/89; 379/207; 379/211; 379/230
[58] Field of Search ................. 379/67, 88, 89, 379/207, 210, 211, 212, 230

[56] References Cited

U.S. PATENT DOCUMENTS

| | | | |
|---|---|---|---|
| 4,905,302 | 2/1990 | Childress et al. | 455/34 |
| 5,018,194 | 5/1991 | Suzuki et al. | 379/211 |
| 5,206,901 | 4/1993 | Harlow et al. | 379/211 |
| 5,327,486 | 7/1994 | Wolff et al. | 379/96 |
| 5,452,349 | 9/1995 | Uehara et al. | 379/211 |
| 5,521,969 | 5/1996 | Paulus et al. | 379/142 |

FOREIGN PATENT DOCUMENTS

| | | |
|---|---|---|
| 0 588 646 A3 | 9/1993 | European Pat. Off. |
| 1194739 | 8/1989 | Japan . |
| 3044159 | 2/1991 | Japan . |

*Primary Examiner*—Fan S. Tsang
*Attorney, Agent, or Firm*—Jenkens & Gilchrist

[57] ABSTRACT

Responsive to an incoming call made to a primary telephone number subscribing to a call transfer calling service feature, a first switching node queries a data base to retrieve at least one transfer-to secondary number. The first switching node then signals other switching nodes in the telephone network to set up an outgoing legs to each secondary number telephone. The signals transmitted by the first switching node further direct each of the other switching nodes in the network to inhibit the initiation of any call transfer service features associated with the secondary number telephones. The signals may further include a transfer service indicator and a counter identifying the number of prior call transfer which have occurred in connection with the originally received call. If the counter exceeds a given preset threshold, the other switching nodes reject further transfer of the call.

33 Claims, 2 Drawing Sheets

SIGNALING IN CALL TRANSFER CALLING OPERATIONS TO CONTROL THE INITIATION OF SECONDARY NUMBER TELEPHONE SERVICE FEATURES

BACKGROUND OF THE INVENTION

1. Technical Field of the Invention

The present invention relates to telephone networks and, in particular, to call transfers made to a secondary number in response to an incoming call made over the telephone network to a primary number, and further to the effectuation of control over the initiation of secondary number service features following such a call transfer.

2. Description of Related Art

Many people today have a telephone for business (office) use, a telephone for home use, and a mobile (cellular) telephone for use when they are away from either their business or home. Some people further may have multiple offices and/or homes each again being associated with a particular telephone. It is common practice for each of a person's telephones to unfortunately be assigned by the telephone service provider with a different telephone number. In order for a caller to maximize his chances for reaching such a person, he or she must know or be able to look up each of that person's telephone numbers (home, office and mobile) and then engage in multiple calls to those numbers. This manual method of number look up and calling is inefficient and often times ineffective.

One known solution addressing this problem involves enabling a person to specify, through use of a call forwarding operation and further in response to an original call made to a first number, the redirection of the call to a specified second number. One drawback associated with this solution is that the call can only be forwarded to one other pre-specified number, so that the person must know where they are going to be located in order to have any subsequent incoming calls effectively forwarded. Another drawback is that the telephone associated with the first number is by-passed by the call forwarding operation and thus cannot be answered by the person while the forwarding feature is initiated. Yet another drawback is that many such systems do not facilitate remote initialization and deactivation of the forwarding feature, thus requiring that the person have access to the telephone for the first number in order to specify a new forwarding second number.

Another known solution addressing the problem provides specialized call handling equipment at each telephone. Using either a second telephone line or a three-way calling feature, the specialized equipment responds to an incoming call by simultaneously or sequentially alerting both the primary telephone being called and a remote (second) telephone specified by the subscriber. A call connection is then completed by the equipment to the first of the plural alerted telephones to be answered. The drawbacks associated with this solution include: only a limited number of telephones may be alerted; the installation of expensive customer specific hardware at the primary calling location; and, subscription to an additional line or three-way calling feature.

Yet another known solution addressing this problem utilizes the telephone switch to respond to an incoming call made to a primary telephone number by simultaneously and/or sequentially calling one or more specified secondary numbers. This is referred to in the art generally as a call transfer operation, and in particular as multi-leg (or multi-destination) calling. When the incoming call is received at the telephone switch, it recognizes that the calling party dialed primary number is associated with a subscriber desiring multi-leg calling. The switch responds thereto by routing the incoming call over a number of different outgoing legs to the plurality of telephones at subscriber specified numbers. The first of the telephones connected to the outgoing legs to answer is then connected by the switch through to the received incoming call, and the remainder of the outgoing legs are dropped.

Call transfer calling operations from and under the control of the telephone switch (rather than at a specific subscriber primary calling location) provide flexibility in calling options and satisfactorily address many of the problems associated with the previously mentioned call handling and routing solutions. Telephone switch controlled call transfer calling is not, however, free from any communications concerns or problems. One or more of the secondary numbers specified for use in making the transfer call responsive to an incoming call to the primary number may be associated with and thus may initiate their own telephone switch controlled service features. In many instances, however, it is not desirable for these service features to be initiated in response to call comprising one of the outgoing legs in a call transfer calling operation. This is especially true with respect to service features providing another single or multi-leg call transfer operation following a prior call transfer calling operation.

For example, if a voice mailbox is associated with a particular secondary number specified in a call transfer calling list associated with a primary number, it may be preferred that the incoming call made to the primary number that triggers a transfer call not be through connected (transferred) to the voice mailbox for the secondary number. Instead, a preference should be given to trying the other calling options of the transfer call first, and further that any message instead be left in the voice mailbox (if any) associated with the originally called primary number. Accordingly, there is a need for a system and method for effectuating control over the initiation of secondary number service features during or as a result of prior call transfer calling operations.

SUMMARY OF THE INVENTION

In a telephone network including a plurality of switching nodes, a first one of the switching nodes receives an incoming call dialed to a primary telephone number. Responsive to the incoming call, the first switching node determines, by querying a data base, whether the telephone associated with the primary number subscribes to a call transfer calling service feature (like call forwarding or multi-leg calling). If yes, at least one secondary telephone number subject to the call transfer calling operation is retrieved from the data base. Commands are then sent by the first switching node to other switching nodes in the network over signaling links to set up on voice trunks at least one outgoing leg connected to the telephone associated with each of the retrieved secondary telephone numbers. The commands transmitted include a control command directing each of the other switching nodes to inhibit with respect to the transferred call the initiation of any call transfer service features associated with the secondary number telephones.

Alternatively, or in addition, the control command further includes a transfer inhibit, a call forwarding feature identifier and a redirection information counter identifying the number of prior call transfers which have occurred in connection with the originally received call. If the counter exceeds a given preset threshold, the other switching nodes reject further transfer of the call. This feature serves to protect against endless call looping transfers or excessive numbers of transfers.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
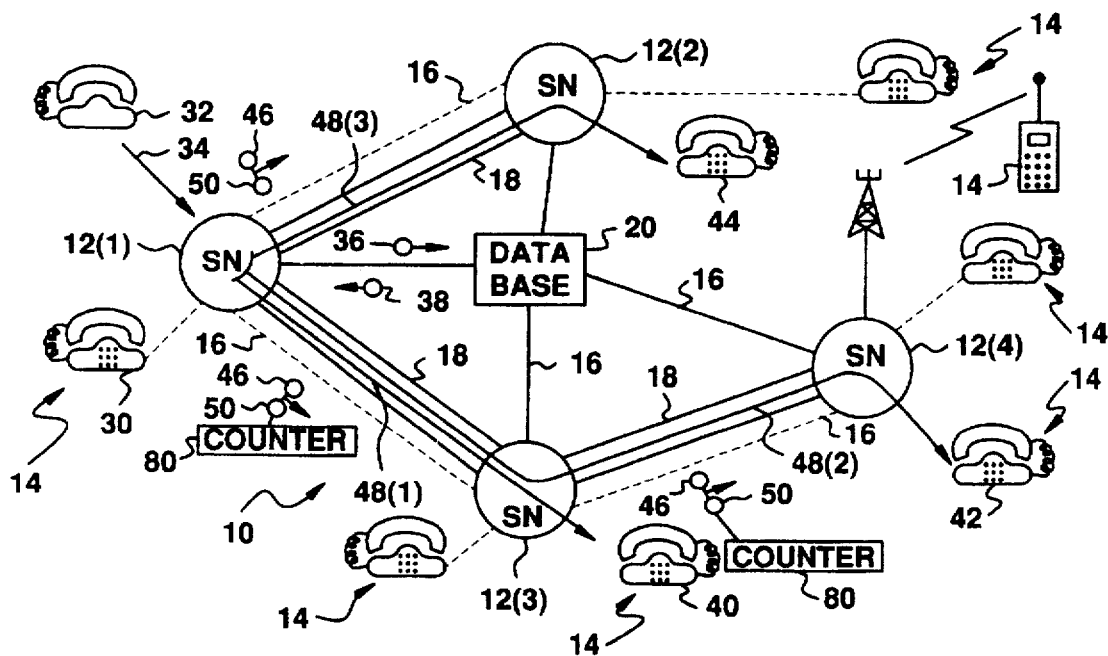
FIG. 1 is a simplified block diagram of a telephone network in which call transfer calling operations are supported.

Reference is now made to FIG. 1 wherein there is shown a schematic diagram of a telephone network 10 including a plurality of interconnected switching nodes (SN) 12. The switching nodes 12 may comprise any one of a number of known telecommunications switching devices, including those commonly used and known in the art for providing either digital or analog land line or cellular telephone service to a plurality of subscriber telephones 14. The switching nodes 12 are interconnected for communication via both signaling links 16 and voice trunks 18. The voice trunks 18 provide voice and data communications paths used to carry subscriber communications between the nodes 12. The signaling links 16 carry command signals between the nodes 12 used for setting up and tearing down voice and data communications links over the voice trunks 18, and for requesting and controlling special service features to the subscribers 14.

The switching nodes 12 are connected to a data base 20 (or perhaps to plural data bases if necessary) also by signaling links 16. The signaling links 16 in this instance carry command signals used for locating subscribers and pre-routing to subscribers. In the case of a land line telephone network, the data base 20 comprises the switching control point data base. For a cellular telephone network, the data base 20 comprises the home location register to which the telephone number for the called mobile station is assigned.

The data base(s) 20 store information concerning the subscriber telephones 14 comprising subscriber telephone numbers related to an identification of certain service features to which the subscribers associated with the telephone numbers are entitled to use. Such service features may include call waiting, three-way calling, paging, voice mail, call forwarding and multi-leg calling. The latter three such service features comprise examples of call transfer service features. It will be understood that the network likely includes many more than just one data base 20, and that the multiple data bases (not shown) within the network are also interconnected by signaling links (like the links 16) carrying command signals used the same purposes as mentioned above.

With respect to the examples of call transfer service features, the voice mail service feature comprises the taking and storing for later subscriber retrieval of a voice message recorded in response to an incoming call made to that subscriber's telephone number. The call forwarding service feature comprises the automatic transfer of an incoming call made to the subscriber's telephone number to another number specified by the subscriber. The multi-leg calling service feature comprises the calling of a plurality of subscriber specified numbers in either a simultaneous or sequential manner in response to an incoming call made to that subscriber's telephone number. Other types of call transfer service features are known to those skilled in the art.

Telephone switching nodes 12 (and their associated data base 20) which facilitate call transfer calling service feature to their land line or cellular subscribers are well known in the art. For example, U.S. Pat. No. 5,206,901 to Harlow, et al. discloses a method an apparatus for alerting multiple telephones as to an incoming call, and thus implement multi-leg calling. The telephone switching node 12 handling the incoming call queries the data base 20 to retrieve routing instructions for the call comprising an identification of a plurality of telephones to be alerted. Responsive to one of the identified telephones answering the alert, the incoming call is through connected to the answering telephone and all other potential connections are dropped. It is not a requirement for purposes of effectuating the multi-leg service feature that the plurality of telephones identified in the routing instructions be serviced by the same switching node 12 that initially received the incoming call and initiated the multi-leg call. Furthermore, dedicated service nodes may be used when needed. The plural telephones identified in the routing instructions may be alerted by the telephone switching node 12 during the multi-leg calling operation either simultaneously or sequentially in accordance with the desires of the called subscriber.

Call forwarding and voice mail transfers are well known in the art. The multi-leg calling operation, which may not be as well known, may be better understood by reference to a specific example. Suppose a telephone call made to a primary number (associated with telephone 30 for the called party) is originated by a calling party from telephone 32 and received at switching node 12(1). Responsive to receipt of this incoming call (over the incoming leg 34), the switching node 12(1) queries 36 the data base 20 (with the signal forwarded from an initial data base to other data bases—not shown—if necessary) to locate the called mobile subscriber and determine whether the called party subscribes to any service features. The retrieved features 38 are then processed by the switching node 12(1) in further handling the incoming call.

If one of the retrieved service features 38 comprises multi-leg calling, the switching node 12(1) is further provided in response to the query with multi-leg routing instructions comprising a list of the secondary telephone numbers to be called as well as an indication of whether sequential or simultaneous calling is to be performed. Similar routing instructions are retrieved if the service feature 38 comprises a call forward or voice mail forward. Suppose now that the list of secondary telephone numbers identifies telephones 40, 42 and 44 for multi-leg calling. The switching node 12(1) then sends commands 46 over the signaling links 16 to the other nodes 12 to set up (sequentially or simultaneously) a plurality of outgoing legs 48 over the voice trunks 18 for connection to and alerting of the telephones 40, 42 and 44 associated with the listed secondary numbers. The first one of the telephones 40, 42 or 44 to be answered is then through connected by the switching node 12(1) via the associated outgoing leg 48 to the incoming leg 34 to complete the call connection between the calling and called parties.

It is recognized that one or more of the telephones identified in call transfer service feature routing instructions may itself be associated in the same or other data base(s) 20 with a call transfer service feature such as voice mail, call forwarding, multi-leg calling, or the like. When such a telephone comprises the primary number for an incoming call, initiation of those subscriber selected service features is desired and is implemented by the switching node 12. When the telephone comprises a secondary number called in connection with the provision of a call transfer calling operation, on the other hand, it is not always desirable that the call transfer service feature be initiated. In certain selected situations, it may instead be preferred that any call transfer service features associated with a telephone number for a secondary telephone called during a call transfer calling operation be ignored or inhibited from initiation.

To facilitate such control over the initiation of call transfer service features during call transfer calling operations, the switching nodes 12 are further configured to generate a control command 50 (which may comprise either an additional command or a parameter within the command 46) for transmission over the signaling links 16 (comprising IS-41 and CCITT7/ANSISS7 TUP/ISUP protocol links) specifying that the outgoing legs of the transferred call are not to invoke any call transfer service features associated in the data base 20 with the telephones for the called secondary numbers. Switching nodes 12 respond to receipt of the command 46 by connecting with the voice trunk and alerting the telephone associated with the called secondary number. Responsive to the control command 50, no data base 20 analysis of the secondary number for purposes of identifying a call transfer service feature is made by the switching node 12 because the call being processed is part of a prior (and service restricted) call transfer calling operation. The switching node 12 may, however, continue to provide other service features (like call waiting or three-way calling), not implicating a call transfer, to the called secondary number telephone during the transferred call. In the event the call is not answered, the switching node 12 aborts and returns control over the call back to the switching node where the incoming call is received (preferably, originally received).

The effectuation of control by the switching node over the initiation of secondary number telephone service features using the message 50 may be better understood with specific reference again to the foregoing multi-leg calling example. The switching node 12(1) receives the list of secondary telephone numbers to be called as well as an indication of whether sequential or simultaneous calling is to be performed (the multi-leg routing instructions). In this example, the list of secondary telephone numbers identifies telephones 40, 42 and 44 for multi-leg calling. The switching node 12(1) then sends commands 46 over the signaling links 16 to the other nodes 12 to set up (sequentially or simultaneously) a plurality of outgoing legs 48 over the voice trunks 18 for connection to and alerting of the telephones 40, 42 and 44 associated with the listed secondary numbers. In addition to, or as parameter within the commands 46, the switching node 12(1) further sends the control command 50 specifying that the outgoing legs 48 of the multi-leg call are not to invoke any call transfer service features associated in the data base 20 with the telephones 40, 42 and 44 for the called secondary numbers. Thus, if the data base 20 records a voice mail call transfer service feature associated with telephone 40, this feature is not implemented by switching node 12(3) upon receipt of the outgoing leg 48(1) of the multi-leg call. Similarly, if the data base 20 records a call forwarding service feature associated with telephone 42, this feature is not implemented by the switching node 12(4) upon receipt of the outgoing leg 48(2) of the multi-leg call. Furthermore, if the data base 20 records a multi-leg calling service feature associated with telephone 44, this feature is not implemented by the switching node 12(2) upon receipt of the outgoing leg 48(3) of the multi-leg call initiated by switching node 12(1). As discussed above, the first one of the telephones 40, 42 or 44 to be answered is then through connected by the switching node 12(1) via the associated outgoing leg 48 to the incoming leg 34 to complete the call connection between the calling and called parties.

Figure 2:
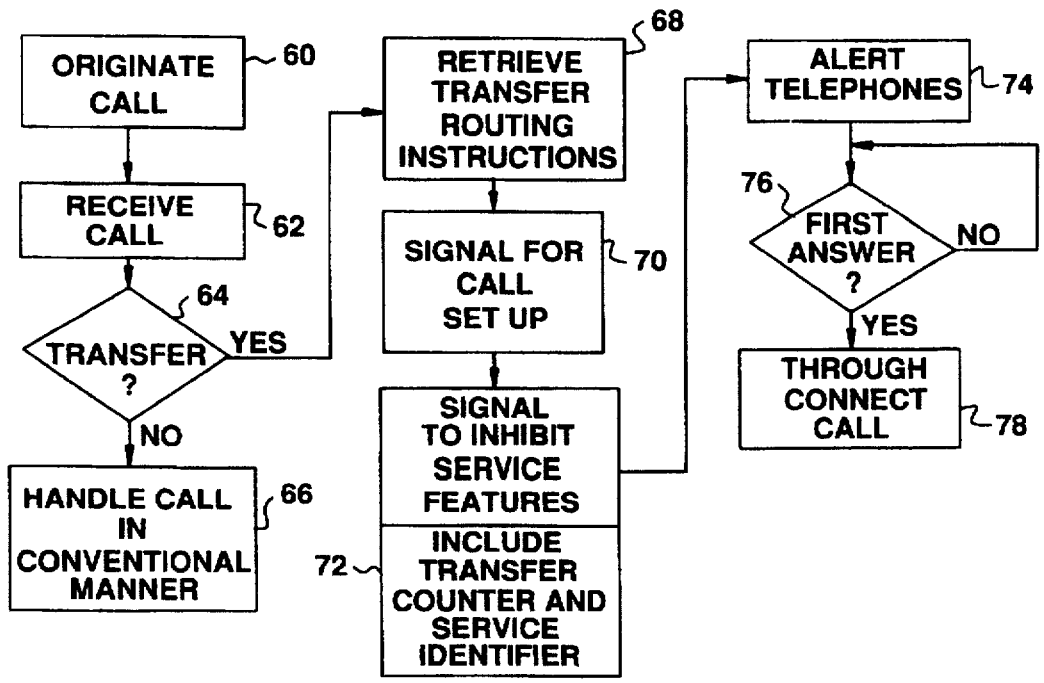
FIG. 2 is a flow diagram for telephone network operation and call handling to inhibit secondary number call transfer calling operations in accordance with the present invention.

Reference is now made to FIG. 2 wherein there is shown a flow diagram for telephone network operation during a call transfer calling operation with controlled secondary number service feature initiation in accordance with the present invention. A call to a primary number over the incoming leg is originated in step 60 and received by the switching node in step 62. The network unsuccessfully attempts to deliver the call to the primary subscriber. This failure can be indicated by time-out, or by an IS-41 redirection request, or by an ISUP call release message. The switching node then determines in step 64 whether the called party associated with the dialed primary number subscribes to a call transfer calling service feature. If not, the incoming call is further handled in a manner well known to those skilled in the art (step 66). If yes, the switching node queries the data base in step 68 to retrieve routing instructions comprising the secondary number(s) that the call is to be transferred to as well as an indication (in connection with a multi-leg call) of whether sequential or simultaneous calling is to be performed. Messages are then sent in step 70 to other switching nodes in the network over the included signaling links in accordance with the retrieved routing instructions to establish one or more outgoing legs over the voice trunks to the telephones for the secondary numbers. A control message is also sent in step 72 (separate from or as a parameter within the step 70 message) directing each of the switching nodes to inhibit the initiation of any call transfer service features associated with the secondary number telephones. This message may include a transfer counter and service identifier parameter if needed. The telephones for the secondary numbers are then alerted in step 74. The switching nodes next test in step 76 for an answering of the alerted telephones, and the incoming call is through completed in step 78 to that answering secondary number telephone.

Reference is now again made to FIG. 1. To further facilitate control over the initiation of call transfer service features during call transfer calling operations, the switching nodes 12 are configured keep track of the number of call transfer operations that have been initiated responsive to an original incoming call, and to store in a counter 80 associated with the control command 50 the tracked number of prior executed call transfers. The command 50 and counter 80 are transmitted over the signaling links 16 (comprising IS-41 and CCITT7/ANSISS7 TUP/ISUP protocol links). Switching nodes 12 respond to receipt of the counter 80 by comparing the stored call transfer value therein to a preset threshold. If the stored value exceeds the threshold, no data base 20 analysis of the secondary number for purposes of identifying a call transfer service feature is made by the switching node 12 because the call has already been transferred by what the system considers to be too many times. The switching node 12 may, however, continue to provide other service features (like call waiting or three-way calling), not implicating a call transfer, to the called secondary number telephone during the transferred call.

The effectuation of control by the switching node over the initiation of secondary number telephone service features using the counter 80 may be better understood with specific reference once again to the foregoing multi-leg calling example. The switching node 12(1) receives the list of secondary telephone numbers to be called as well as an indication of whether sequential or simultaneous calling is to be performed (the multi-leg routing instructions). In this example, the list of secondary telephone numbers identifies telephones 40, 42 and 44 for multi-leg calling. The switching node 12(1) then sends commands 46 over the signaling links 16 to the other nodes 12 to set up (sequentially or simultaneously) a plurality of outgoing legs 48 over the voice trunks 18 for connection to and alerting of the telephones 40, 42 and 44 associated with the listed secondary numbers. In addition to, or as parameter within the commands 46, the switching node 12(1) further sends the control command 50 specifying that the outgoing legs 48 of the multi-leg call are not to invoke any call transfer service features associated in the data base 20 with the telephones 40, 42 and 44 for the called secondary numbers and a counter 80 with a value of one (indicating that only a single transfer has been initiated with respect to the original call). Suppose now that switching node 12(3) ignores (perhaps through a processing error) or has not been upgraded to respond to the inhibiting command 50. Thus, if the data base 20 records a call forwarding service feature (specifying telephone 42) associated with telephone 40, this feature would be improperly executed by the switching node 12(3). Commands 46 are then sent to establish an outgoing leg to switching node 12(4). In addition to, or as parameter within the commands 46, the switching node 12(1) further sends the control command 50 and a counter 80 with a value of two (indicating that a second transfer has been initiated with respect to the original call). Responsive to receipt of the transferred call, switching node 12(4) compares the value of the counter 80 with its preset threshold value. If that threshold value were one, the counter value would exceed the threshold and the switching node 12(4) would not implement any more call transfer service features.

Figure 3:
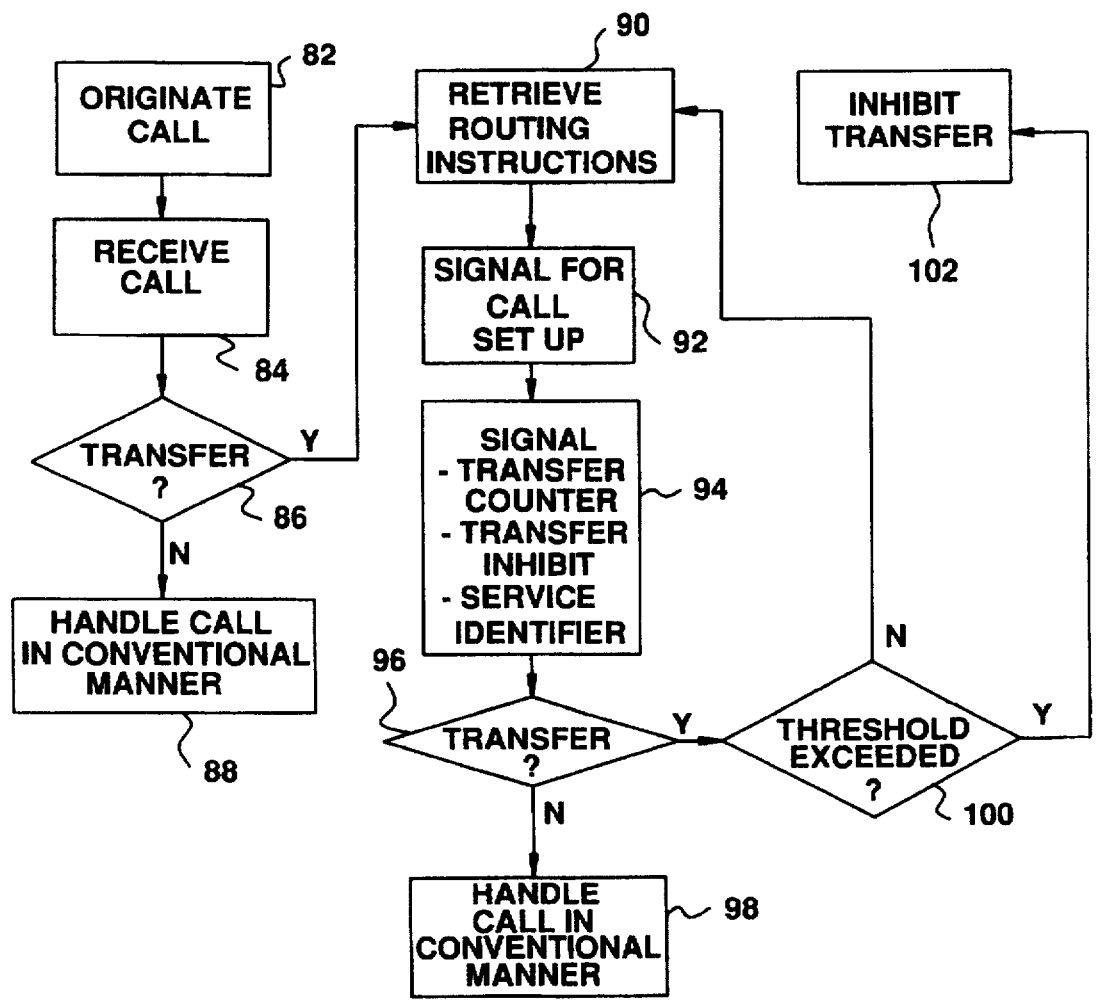
FIG. 3 is a flow diagram for telephone network operation and call handling to restrict call transfer calling operations in accordance with the present invention.

Reference is now made to FIG. 3 wherein there is shown a flow diagram for telephone network operation during a call transfer calling operation with controlled secondary number service feature initiation in accordance with the present invention. A call to a primary number over the incoming leg is originated in step 82 and received by the switching node in step 84. The network unsuccessfully attempts to deliver the call to the primary subscriber. This failure can be indicated by time-out, or by an IS-41 redirection request, or by an ISUP call release message. The switching node then determines in step 86 whether the called party associated with the dialed primary number subscribes to a call transfer calling service feature. If not, the incoming call is further handled in a manner well known to those skilled in the art (step 88). If yes, the switching node queries the data base in step 90 to retrieve routing instructions comprising the secondary transfer-to number(s). Messages are then sent in step 92 to other switching nodes in the network over the included signaling links in accordance with the retrieved routing instructions to establish one or more outgoing legs over the voice trunks to the telephones for the secondary numbers. A counter and service indicator are also sent in step 94 (separate from or as a parameter within the step 92 message) identifying the number of executed transfers for the originally received call. A transfer inhibit may also be sent with this message. The switching nodes next test in step 96 whether a call transfer is initiated by the call. If no, the call is handled in conventional fashion (perhaps through an answer or the initiation of other call service features) in step 98. If yes, the switching node tests in step 100 whether the counter value exceeds a preset threshold. If not, the process returns to step 90 to implement the transfer and the counter value is increased by one to reflect the occurrence of an additional transfer. If yes, the transfer is inhibited in step 102.

One additional benefit of the use of the counter 80 in monitoring call transfers is that call transfer looping situations can be avoided. By monitoring the value of the counter 80, a switching node may infer from a large number recorded therein that the call at issue has become involved in an infinite loop of transfers (i.e., A specifies B as its forward-to subscriber, B specifies C as its forward-to subscriber, and C specifies A as its forward-to subscriber). Such situations must be identified and stopped, or the infinite looping of transferred calls will quickly occupy all the calling circuits in one or more switching nodes resulting in switch congestion.

In connection with one embodiment of the present invention, existing messages and parameters established for use within a digital telephone network may be adopted and possibly adapted for use in providing the control messages 50 and counter 80. For example, for a digital land line telephone network, the existing integrated services digital network user part (ISDN-UP) message Initial Address Message (IAM) communicated over the signaling links may be modified to provide the parameters transfer inhibit, service identifier and redirection information (comprising the control messages 50 and counter 80) needed for inhibiting switching node initiation of secondary number telephone call transfer service features. Furthermore, for a cellular telephone network, these parameters may also be included in IS-41 specified messages (like the location request, transfer to number request and routing request messages) to signal switching nodes of those instances in connection with a call transfer calling operation wherein secondary number telephone call transfer service features are not to be initiated.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for controlling the initiation of secondary number telephone service features during a call transfer calling operation, comprising the steps of:

responsive to receipt of a telephone call dialed to a primary telephone number subscribing to a call transfer service feature, retrieving at least one of a plurality of secondary telephone numbers associated with the primary telephone number;

setting up a transfer call via at least one switching node to a telephone for each of the retrieved plurality of secondary telephone numbers; and signaling each switching node in connection with setting up the transfer call not to activate a service feature associated with the secondary telephone numbers.

2. The method as in claim 1 wherein the transfer call comprises a multi-leg call and wherein the step of setting up comprises the step of setting up the multi-leg call to telephones of a retrieved plurality of secondary telephone numbers in a sequential manner.

3. The method as in claim 1 wherein the transfer call comprises a multi-leg call and wherein the step of setting up comprises the step of setting up the multi-leg call to telephones of a retrieved plurality of secondary telephone numbers in a simultaneous manner.

4. The method as in claim 1 wherein the service feature associated with the secondary number telephones comprises a call transfer service feature.

5. The method as in claim 4 wherein the call transfer service feature comprises a call forwarding operation from the secondary number telephone to another telephone.

6. The method as in claim 4 wherein the call transfer service feature comprises a voice mail transfer from the secondary number telephone to a voice mail box.

7. The method as in claim 4 wherein the call transfer service feature comprises a multi-leg calling operation originating from the secondary number telephone.

8. A telephone system providing call transfer calling operations, comprising:
- a plurality of interconnected switching nodes, including: a first switching node for receiving an incoming call dialed to a primary number subscribing to a call transfer calling service feature and setting up a transfer call to at least one of a plurality of identified secondary number telephones; and, at least one second switching node to which the transfer call is destined; and
- wherein the first switching node signals each second switching node in connection with the transfer call set-up not to activate with respect to the transfer call a service feature associated with the secondary number telephones.

9. The system of claim 8 wherein the transfer call comprises a multi-leg call set up by the first to the second switching nodes identified by the secondary number telephones in a sequential manner.

10. The system of claim 8 wherein the transfer call comprises a multi-leg call set up by the first to the second switching nodes identified by the secondary number telephones in a simultaneous manner.

11. The system of claim 8 wherein the service feature associated with the secondary number telephones comprises a call transfer service feature.

12. The system of claim 11 wherein the call transfer service feature comprises a call forwarding operation from the secondary number telephone to another telephone.

13. The system of claim 11 wherein the call transfer service feature comprises a voice mail transfer from the secondary number telephone to a voice mail box.

14. The system of claim 11 wherein the call transfer service feature comprises a multi-leg calling operation originating from the secondary number telephone.

15. A telephone system, comprising:
- a plurality of switching nodes;
- a plurality of voice trunks connecting the plurality of switching nodes;
- a plurality of signaling links connecting the plurality of switching nodes; and
- wherein an originating one of the switching nodes transmits signals over the signaling links to certain other ones of the switching nodes to set up on the voice trunks a transfer call to a destination telephone, the signals including a control command instructing the certain other ones of the switching nodes to inhibit initiation of service features associated with the destination telephone for the duration of the transfer call.

16. The system of claim 15 wherein the telephone system is a cellular telephone system.

17. The system of claim 15 wherein service features comprises a call forwarding operation from the destination telephone to another telephone.

18. The system of claim 15 wherein service features comprises a voice mail transfer from the destination telephone to a voice mail box.

19. The system of claim 15 wherein service features comprises multi-leg call originating from the destination telephone.

20. A method for controlling service feature initiation during a call transfer calling operation wherein at least one outgoing call leg is set up to a destination telephone through at least one switching node, comprising the steps of:
- transmitting a command control signal during call set up identifying each outgoing call leg as a part of a transfer call; and
- for the duration of the transfer call, inhibiting at each switching node receiving the transmitted command control signal the initiation of call transfer service features associated with the destination telephone connected to each outgoing call leg.

21. The method of claim 20 wherein the call transfer service features comprise a call forwarding operation from the destination telephone to another telephone.

22. The method of claim 20 wherein the call transfer service features comprise a voice mail transfer from the destination telephone to a voice mail box.

23. The method of claim 20 wherein the call transfer service features comprise a multi-leg call originating from the destination telephone.

24. A method for controlling the initiation of secondary number telephone service features during a call transfer calling operation, comprising the steps of:
- responsive to receipt of a telephone call to a telephone number subscribing to a call transfer service feature, retrieving at least one of a plurality of secondary telephone numbers associated with the telephone number;
- setting up a transfer call via at least one switching node to a telephone for each of the retrieved plurality of secondary telephone numbers;
- signaling each switching node in connection with setting up the transfer call with a counter identifying the number of previous call transfers associated with the telephone call; and
- comparing the call transfer number from the counter with a present threshold and inhibiting further transfers of the telephone call if the counter number exceeds the threshold.

25. The method as in claim 24 wherein the service feature associated with the secondary number telephones comprises a call transfer service feature.

26. The method as in claim 25 wherein the call transfer service feature comprises a call forwarding operation from the secondary number telephone to another telephone.

27. The method as in claim 25 wherein the call transfer service feature comprises a voice mail transfer from the secondary number telephone to a voice mail box.

28. The method as in claim 25 wherein the call transfer service feature comprises a multi-leg calling operation originating from the secondary number telephone.

29. A telephone system, comprising:
- a plurality of switching nodes;
- a plurality of voice trunks connecting the plurality of switching nodes;
- a plurality of signaling links connecting the plurality of switching nodes; and wherein a currently handling one of the switching nodes transmits signals over the signaling links to certain other ones of the switching nodes to set up on the voice trunks a transfer call to a destination telephone, the signals including a counter identifying the number of previous call transfers associated with the transfer call, the counter interpreted by the other switching nodes to inhibit initiation of service features associated with the destination telephone if the call transfer number exceeds a preset threshold.

30. The system of claim 29 wherein the telephone system is a cellular telephone system.

31. The system of claim 29 wherein service features comprises a call forwarding operation from the destination telephone to another telephone.

32. The system of claim 29 wherein service features comprises a voice mail transfer from the destination telephone to a voice mail box.

33. The system of claim 29 wherein service features comprises multi-leg call originating from the destination telephone.

* * * * *